Nov. 22, 1932.　　　C. G. SCHILLING　　　1,888,411
EVAPORATED MILK SERVER AND PRESERVER
Filed Sept. 11, 1931
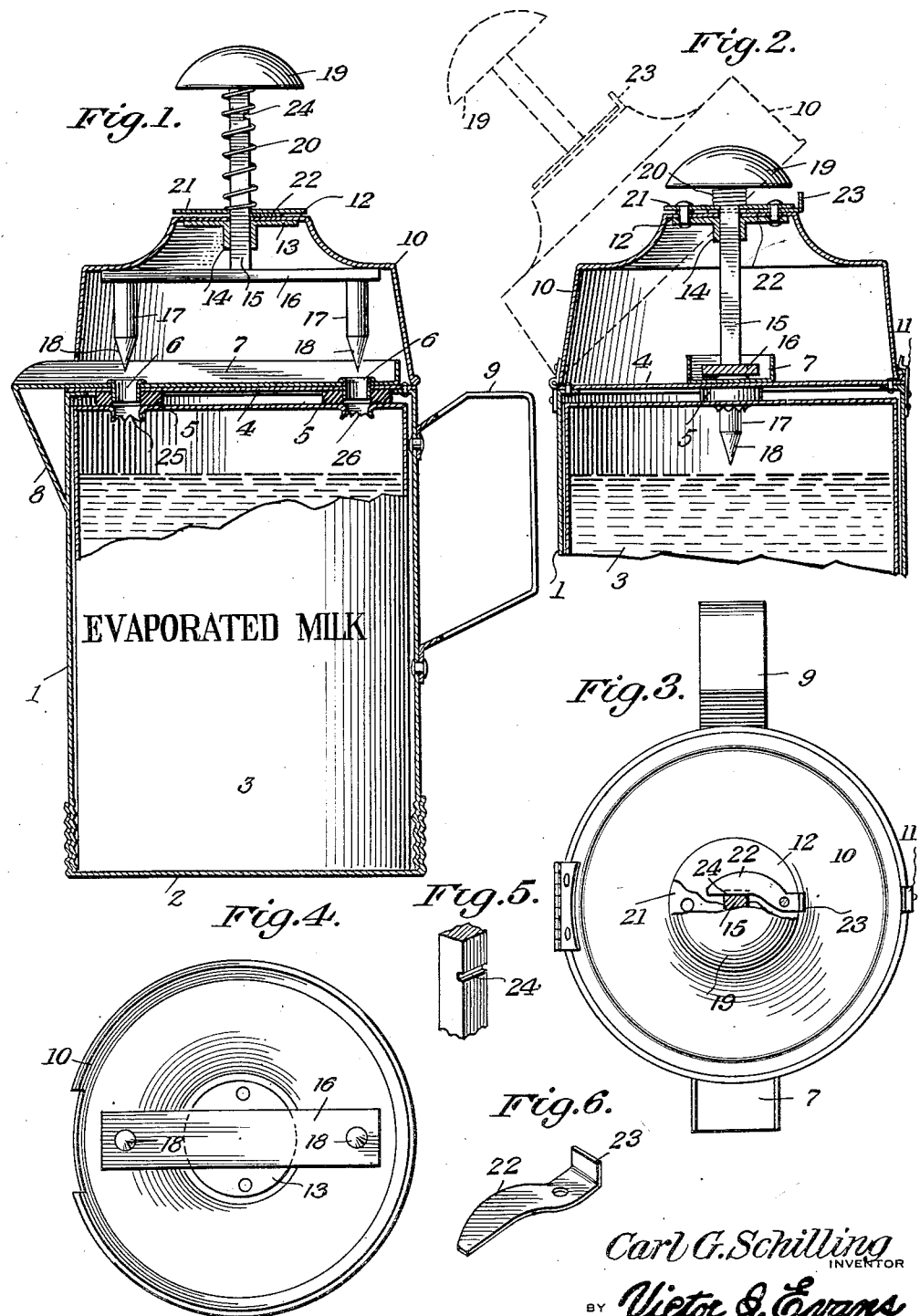
Carl G. Schilling
INVENTOR
BY Victor J. Evans
and Co.　ATTORNEYS

Patented Nov. 22, 1932

1,888,411

UNITED STATES PATENT OFFICE

CARL G. SCHILLING, OF OAKLAND, CALIFORNIA

EVAPORATED MILK SERVER AND PRESERVER

Application filed September 11, 1931. Serial No. 562,336.

An object is the provision of a holding device for canned milk or the like in which the contents of the can may be readily poured therefrom in desired quantities, but which will seal and preserve the contents of the can after each pouring operation.

A further object is the provision of an article for this purpose which will receive and effectively hold therein milk or like containing cans of different sizes, which will perforate the cans to provide the same with an outlet and an air vent opening; which has a spout for directing the liquid from the openings and which will close the openings and practically hermetically seal the can when the contents are not being used.

To the attainment of the foregoing, the invention consists in the improvement as hereinafter described and definitely claimed.

Figure 1 is a central longitudinal sectional view through the improvement, the can being partly in section.

Figure 2 is a sectional view through the upper portion of the improvement, the cover being shown in open position by the dotted lines.

Figure 3 is a top plan view.

Figure 4 is an inverted plan view of the cover.

Figure 5 is a detail perspective view of the plunger rod.

Figure 6 is a similar view of the latch.

The body 1 of the improvement is cylindrical in shape and has screwed on its open bottom a flanged disk 2 on which rests a can 3, containing evaporated milk, syrup or the like. The adjustable bottom disk 2 forces the can toward the top 4 of the body 1, and against compressible disks 5 on the inner face of the top.

The top 4 has centrally secured thereon, by a pair of spaced hollow rivets 6, a spout 7. The spout has a closed inner end and an open or pouring end that projects beyond the top and is reinforced by an angle plate or lip 8.

The rivets 6 enter the compressible disks 5 and hold them in place.

Hingedly secured to the top, at the side thereof, at right angles to the projecting portion of the spout 7, on the body 1, is the cover 10 of the improvement. The cover is dome shaped, but has its outer portion rounded inwardly to its flat top. The cover has a notch to receive the spout therein and the said cover is held closed by a spring catch 11.

The inner face of the flat top 12 of the closure has riveted thereto a disc 13 provided with a central depending sleeve 14 that has a square bore which communicates with a square opening in the top 12. Through these openings there is guided a cross sectionally square plunger rod 15. On the inner end of the plunger rod there is centrally fixed a plate 16 that carries at its ends depending penetrating elements 17 whose pointed ends 18 are disposed opposite the bores of the rivets 6 and which are designed, when the plunger rod is operated, to pass through the rivets and penetrate the top of the can 3, to provide the same with a pouring opening and with an air vent opening, and which are likewise designed to close and establish an airtight joint for these openings, as will presently be apparent.

The plunger rod has an outer rounded head 19 against which a coiled spring 20 exerts a pressure to raise the rod and penetrating elements 17 to the position disclosed by Figure 1 of the drawing. In this position the holes in hollow rivets and in top of can will be open and a quantity of milk or other liquid may be poured from the can upon tilting of the body 1.

On the outer face of the top 12 of the closure there is secured by the rivets that hold the disk 13 thereon, another disk 21. Pivotally mounted on one of the rivets and swingable between the outer disk and the closure top 12, there is a latch plate 22. The end of the latch that extends beyond the disk 21 is flanged or bent to provide a finger grip 23. The plunger rod 15, adjacent to the head 19, is provided with a transverse notch 24, to receive therein the latch 22 when the rod is moved inwardly through the closure to hold the penetrating element in the openings 25 and 26 and practically hermetically seal the can 3. A release of the latch permits the spring 20 to expand and raise the rod to move the elements 17 out of the holes 25 and 26, so that the contents of the can can be poured therefrom, as previously set forth.

The device is simple in nature and construction. The can is effectively sealed when its contents are not required for use and the said contents are effectively protected from insects or dust.

The improvement is, of course, susceptible to such changes and modifications as fall within the scope of the appended claims.

What I claim is:—

1. A casing having a closed top provided with a spout, hollow rivets holding the spout on the top, compressible disks held on the inner face of the top by said rivets, a bottom adjustably secured to the casing to afford a rest for forcing a fluid containing can against the disks, a hinged closure on the top of the casing, a spring latch therefor, penetrating elements carried by the closure movable through the washers to enter the top of the can, means for holding the elements in such position, and spring means for moving the elements in a second direction when the holding means are released.

2. A casing having a closed top provided with a spout, hollow rivets holding the spout on the top, compressible disks held on the inner face of the top by said rivets, a bottom adjustably secured to the casing to afford a rest for forcing a fluid containing can against the disks, a hinged closure on the top of the casing, a spring latch therefor, a spring influenced plunger rod movable therethrough, a plate on the rod, penetrating elements having pointed ends on the plate normally arranged opposite the hollow rivets and movable therethrough to penetrate the can when the plunger rod is moved inwardly of the closure, and means for latching the plunger rod when thus moved.

3. A casing having a closed top provided with a spout, hollow rivets holding the spout on the top, compressible disks held on the inner face of the top by said rivets, a bottom adjustably secured to the casing to afford a rest for forcing a fluid containing can against the disks, a dome shaped closure hinged to the top and having a notch to receive the spout therein, means for latching the closure to the casing, a sleeve having a square bore secured to and extending inwardly from the top of the closure, a headed cross sectionally square plunger rod movable through the top and sleeve, a plate on the inner end of the rod, penetrating elements on the plate in a line with the hollow rivets, a spring for moving the rod outwardly from the closure and a swingable latch on the closure to engage with the rod when the said rod is moved to cause the penetrating elements to pierce the top of the can.

In testimony whereof I affix my signature.

CARL G. SCHILLING.